United States Patent [19]

Tanaka et al.

[11] Patent Number: 4,542,073

[45] Date of Patent: Sep. 17, 1985

[54] CERAMIC BONDED STRUCTURE AND METHOD OF MANUFACTURING THE SAME

[75] Inventors: Shun-ichiro Tanaka; Nobuyuki Mizunoya; Shigeo Abe, all of Yokohama, Japan

[73] Assignees: Thomson CSF, Paris; Compagnie d'Electronique et de Piezo-Electricite, Sartrouville, both of France

[21] Appl. No.: 599,579

[22] Filed: Apr. 12, 1984

[30] Foreign Application Priority Data

Apr. 13, 1983 [JP] Japan .................................. 58-63676

[51] Int. Cl.⁴ ............................ B32B 9/04; C09J 1/00
[52] U.S. Cl. ..................................... 428/446; 156/89; 156/325
[58] Field of Search .................. 428/446, 450; 156/89, 156/325

[56] References Cited

U.S. PATENT DOCUMENTS

| | | | |
|---|---|---|---|
| 2,609,318 | 9/1952 | Swentzel | 428/450 |
| 3,394,026 | 7/1968 | Parr et al. | 428/446 |
| 3,993,844 | 11/1976 | Kiger et al. | 156/89 |
| 4,447,283 | 5/1984 | Ebata et al. | 156/325 |
| 4,486,257 | 12/1984 | Ebata et al. | 156/325 |

*Primary Examiner*—William J. Van Balen
*Attorney, Agent, or Firm*—Cushman, Darby & Cushman

[57] ABSTRACT

A ceramic bonded structure with a high bonding strength has a first member of a ceramic, a ceramic-modified bonding layer formed on at least a bonding surface of the first member by a thermal treatment, a metal layer formed on the ceramic-modified bonding layer, and a second member of a ceramic or metal bonded with the first member through the metal layer.

31 Claims, No Drawings

CERAMIC BONDED STRUCTURE AND METHOD OF MANUFACTURING THE SAME

BACKGROUND OF THE INVENTION

The present invention relates to a ceramic bonded structure and a method of manufacturing the same.

Many attempts to use ceramics as structural materials have recently been made. In such a case, a ceramic member must frequently be bonded with another member of ceramic or metal. Bonding of a ceramic member with another such member is conventionally performed by using an adhesive agent or by metallizing a ceramic member surface with Mo-Mn or the like and then brazing or the like.

However, with the method which uses an adhesive agent, the application temperature range of the resultant structural material is low. With the method which utilizes metallizing, the ceramics which can be metallized are limited to alumina and the like. Therefore, this method cannot be directly applied to ceramics suitable as structural materials, such as silicon nitride.

SUMMARY OF THE INVENTION

It is an object of the present invention to provide a ceramic bonded structure wherein a ceramic member is securely bonded with another member.

It is another object of the present invention to provide a method of manufacturing the ceramic bonded structure described above.

A ceramic bonded structure of the present invention comprises a first member of a ceramic, a ceramic-modified bonding layer formed on at least a bonding surface of said first member, a metal layer formed on said ceramic-modified bonding layer, and a second member bonded to said first member through said metal layer.

The ceramic material of the first member of the ceramic bonded structure of the present invention can be alumina, silicon nitride, silicon carbide, Sialon, zirconia or the like. Silicon series ceramics called Engineering Ceramics such as silicon nitride, silicon carbide, or Sialon are particularly preferable due to their high mechanical strength at high temperatures.

The material of the second member can be a ceramic selected from those enumerated above, a metal such as Cu alloy, Fe alloy, Ni alloy, or the like.

A ceramic-modified bonding layer is formed on at least a bonding surface of the first member. This ceramic-modified bonding layer is formed by performing a predetermined treatment of the surface of the first member so as to modify it. The predetermined treatment can be a thermal treatment in an oxidizing atmosphere. For example, when a thermal treatment of a silicon series ceramic is performed in an oxidizing atmosphere, the ceramic and the oxygen as the bonding agent react with each other to form a bonding layer which comprises silicate (crystal phase and glass phase) consisting mainly of $SiO_2$. This bonding layer can be securely bonded with a metal layer of copper or a copper alloy or the like. The ceramic-modified bonding layer preferably has a thickness of 0.1 to 20 $\mu$m. The heating temperature for the thermal treatment preferably falls within the range of 1,200° C. to 1,400° C., and the heating time preferably falls within the range of 10 minutes to 20 hours. Crystal grains are formed on the surface of the thus-formed ceramic-modified bonding layer. Since the crystal boundaries of the ceramic-modified bonding layer are considered to contribute to good bonding with the metal bonding layer, the crystal grain size is preferably 100 $\mu$m or less.

A metal layer is formed on the ceramic-modified bonding layer. This metal bonding layer is formed by bringing a metal sheet of a thickness of 10 $\mu$m or more into contact with the ceramic-modified bonding layer, and heating the obtained structure. Upon being heated, the sheet and layer react with each other and are securely bonded to each other. The metal sheet has a thickness of, preferably 30 $\mu$m to 2 mm, more preferably 50 $\mu$m to 300 $\mu$m. When a silicon series ceramic is used as the material of the first member, copper or a copper alloy is preferably used as the material of the metal layer to allow satisfactory bonding. The thermal treatment for securely bonding the metal layer and the ceramic-modified bonding layer is performed within a temperature range which is below the melting point of the metal and which allows the bonding reaction between the two layers. When the metal bonding layer consists of copper and bonding is performed without pressing, such a temperature range is given to be 1,065° to 1,083° C.

The first and second members are bonded through such a metal bonding layer.

When the second member consists of a ceramic (especially non-oxide ceramic), a ceramic-modified bonding layer must also be formed on at least the bonding surface of the second member, as in the case of the first member. Bonding of the first and second members is performed by bringing the ceramic-modified bonding layer of the first member into contact with one surface of the metal layer and bringing the ceramic-modified bonding layer of the second member into contact with the other surface of the metal bonding layer, and then heating the obtained structure. As a result, a ceramic bonded structure having a high bonding strength is obtained. With this bonded structure, a part of a complex shape which can conventionally be obtained only by cutting from a single ceramic block, or a large part, can be simply manufactured by sequentially bonding split parts to form such a part. By selecting a ceramic of suitable characteristics, a ceramic structure having desired characteristics at a predetermined portion can be obtained.

When the second member consists of a metal, a bonded structure of a ceramic member and a metal member can be obtained by bonding using a conventional method, for example, brazing the second member and a metal layer formed on the surface of a first member through a ceramic-modified bonding layer. The bonded structure obtained in this manner has composite functions of wear resistance, heat resistance, high thermal conductivity, and corrosion resistance.

When bonding surfaces of the two members are curved or tapered to provide a desired mechanical fitting effect, the two members can be bonded with still higher strength.

DETAILED DESCRIPTION OF THE PREFERRED EMBODIMENT

The present invention will now be described by way of its examples.

EXAMPLE 1

Two sintered ceramic blocks mainly consisting of $Si_3N_4$ (dimensions of $20 \times 15 \times 30$ mm) were subjected to a thermal treatment in air at 1,300° C. (1,250° to 1,350° C.) for 10 hours to form ceramic-modified bonding layers on the respective ceramic blocks. Ceramic-modified bonding layers of better quality were obtained with a thermal treatment time of 4 to 16 hours when the thermal treatment temperature was 1,250° C., and with a thermal treatment time of 20 minutes to 6 hours when the thermal treatment temperature was 1,350° C. A tough pitch copper sheet (having a thickness of 0.5 mm) was inserted between the two ceramic blocks, and another thermal treatment at a temperature of 1,078° C. was performed for about 15 minutes in a nitrogen atmosphere. The bonded surface of the resultant structure had a shearing strength as high as 6 to 12 kg/mm$^2$. When bonding was performed of several ceramic block pairs which had been subjected to thermal treatments at various temperatures, the best bonding strength was obtained when the thermal treatment temperature was about 1,300° C.

Observation with an optical microscope of the ceramic block after the thermal treatment revealed that the surface of the block had flake-like crystal grains formed thereon. When the crystal grain size is too small, a good bonding strength cannot be obtained. Therefore, the crystal grain size is preferably 100 $\mu$m or less. Observation with EPMA and SEM-EDX of the bonded surface after such bonding revealed the presence of the reaction phase with $Cu_2O$ from the crystal boundary as well as $Cu_2O$ from the copper grains. When the latter reaction phase is predominant, the copper crystal grains are recrystallized in the reaction phase to provide polygonal network structures, and the bonding strength is effectively improved.

When a flexure test of the bonded structure obtained in this example was performed, the structure was confirmed to have a flexural strength suitable for it to be used as a structural material. When a similar flexure test was performed for bonded structures obtained under different ceramic body thermal treatment conditions, one having ceramic bodies which had been thermally treated at 1,250° C. exhibited the best flexural strength of 40 kg/mm$^2$. However, a satisfactory flexural strength of about 20 kg/mm$^2$ was obtained with structures having ceramic bodies thermally-treated at about 1,300° C.

EXAMPLE 2

A ceramic block consisting mainly of $Si_3N_4$ (dimensions of 25×10×5 mm) was thermally-treated under the same condition as in Example 1 to form a ceramic-modified bonding layer thereon. Another ceramic block consisting mainly of AlN block (dimensions of 25×10×5 mm) was thermally-treated in air at 1,200° C. for 2 to 5 hours to form another ceramic-modified bonding layer thereon. Subsequently, after inserting a tough pitch copper sheet between the two blocks, they were bonded following the same procedures as in Example 1 to provide a bonded structure having a high bonding strength. Observation with EPMA and SEM-EDX of the structure revealed that a bonding layer comprising $Al_2O_3$-$Cu_2O$ was formed between the AlN and Cu.

In a similar manner to that described above, ceramic bonded structures comprising a pair of any two ceramics selected from $Al_2O_3$, Aln, $Si_3N_4$, SiC, and Sialon can be prepared. AlN and SiC have high thermal conductivities, $Si_3N_4$ and SiC have high mechanical strength at high temperatures and an excellent corrosion-resistive properties, $Al_2O_3$ has an excellent alkali-resistive property, and $Si_3N_4$ has an excellent abrasion-resistive property. Therefore, different combinations of these ceramics allow the manufacture of ceramic structures which it has heretofore been impossible to manufacture.

EXAMPLE 3

An $Si_3N_4$-based sintered block (dimensions of 20×40×5 mm) was thermally-treated in air at 1,300° C. for 10 hours to form a ceramic-modified bonding layer on its surface. Therefore, a tough pitch copper sheet (0.3 mm thickness) was placed on the bonding surface of the sintered body, and the resultant structure was thermally-treated in $N_2$ at 1,078° C. for 10 minutes to form a metal layer thereon. An Ni-plated cast iron block (dimensions of 20×20×5 mm) was then placed on the metal bonding layer through silver solder. Brazing was performed at about 840° C. for 5 minutes to provide a bonded structure. The bonded structure had at its bonded surface a shearing strength as high as about 10 kg/mm$^2$. The bonded structure obtained in this manner can be used in a variety of applications such as in the manufacture of sliding parts or rotating parts.

In summary, according to the present invention, a ceramic bonded structure with a high bonding strength which has heretofore been impossible to attain can be obtained. Selection of members to be bonded allows a wide variety of applications.

What is claimed is:

1. A ceramic bonded structure comprising a first member of a ceramic, a ceramic-modified bonding layer formed on at least a bonding surface of said first member, a metal layer formed on said ceramic-modified bonding layer, and a second member bonded to said first member through said metal layer.

2. A ceramic bonded structure according to claim 1, wherein said first member consists of a ceramic containing silicon.

3. A ceramic bonded structure according to claim 2, wherein the ceramic containing silicon is a member selected from the group consisting of silicon nitride, silicon carbide, and sialon.

4. A ceramic bonded structure according to claim 2, wherein said ceramic-modified bonding layer comprises a silicate.

5. A ceramic bonded structure according to claim 1, wherein said ceramic-modified bonding layer has a thickness of 0.1 to 20 $\mu$m.

6. A ceramic bonded structure according to claim 1, wherein said metal layer consists essentially of a metal selected from the group consisting of copper and copper alloys.

7. A ceramic bonded structure according to claim 1, wherein said metal layer has a thickness of 10 $\mu$m or more.

8. A ceramic bonded structure according to claim 7, wherein said metal layer has a thickness of 30 $\mu$m to 2 mm.

9. A ceramic bonded structure according to claim 7, wherein said metal layer has a thickness of 50 to 300 $\mu$m.

10. A ceramic bonded structure according to claim 1, wherein said second member consists of a ceramic and a ceramic-modified bonding layer is formed on at least a bonding surface thereof.

11. A ceramic bonded structure according to claim 1, wherein said second member consists of a metal.

12. A ceramic bonded structure according to claim 11, wherein a surface of said second member is plated with a metal which can be bonded with said metal bonding layer.

13. A ceramic bonded structure according to claim 12, wherein said second member consists of iron alloy and has a surface thereof plated with nickel.

14. A method of manufacturing a ceramic bonded structure, comprising the steps of: performing a first thermal treatment of a first member of a ceramic to modify a surface thereof and to form a ceramic-modified bonding layer thereon; performing the first thermal treatment of a second member of a ceramic to modify a surface thereof and to form a ceramic-modified bonding layer thereon; bringing said first and second members into contact with each other through a metal sheet interposed therebetween; and bonding said first and second members by performing a second thermal treatment at a temperature which allows a reaction between said metal sheet and said ceramic-modified bonding layers and is not higher than a melting point of said metal sheet.

15. A method according to claim 14, wherein said first thermal treatment is performed in an oxidizing atmosphere at 1,200 to 1,400° C. from 10 minutes to 20 hours.

16. A method according to claim 14, wherein said ceramic-modified bonding layer has a crystal grain of not more than 100 μm.

17. A method according to claim 14, wherein said first and second members contain the same or different types of ceramics containing silicon.

18. A method according to claim 17, wherein said ceramic containing silicon is a member selected from the group consisting of silicon nitride, silicon carbide, and Sialon.

19. A method according to claim 14, wherein said metal sheet consists essentially of a metal selected from the group consisting of copper and copper alloys.

20. A method according to claim 15, wherein said metal sheet has a thickness of 10 μm or more.

21. A method according to claim 20, wherein said metal sheet has a thickness of 30 μm to 2 mm.

22. A method according to claim 20, wherein said metal sheet has a thickness of 50 to 300 μm.

23. A method of manufacturing a ceramic bonded structure, comprising the steps of: performing a first thermal treatment of a first member of a ceramic so as to modify a surface thereof and to form a ceramic-modified bonding layer thereon; bringing said ceramic-modified bonding layer into contact with a metal sheet; performing a second thermal treatment at a temperature at which said metal sheet and said ceramic-modified bonding layer react with each other and which is not higher than a melting point of a metal of said metal sheet so as to bond said ceramic-modified bonding layer and said metal sheet; and bonding a second member of a metal with said metal sheet.

24. A method according to claim 23, wherein said first thermal treatment is performed in an oxidizing atmosphere at 1,200 to 1,400° C. from 10 minutes to 20 hours.

25. A method according to claim 23, wherein said ceramic-modified layer has a thickness of 0.1 to 20 μm.

26. A method according to claim 23, wherein said first member consists of a ceramic containing silicon.

27. A method according to claim 26, wherein said ceramic containing silicon is a member selected from the group consisting of silicon nitride, silicon carbide and Sialon.

28. A method according to claim 23, wherein said metal sheet consists essentially of a metal selected from the group consisting of copper and copper alloys.

29. A method according to claim 23, wherein said metal sheet has a thickness of 10 μm or more.

30. A method according to claim 29, wherein said metal sheet has a thickness of 30 μm to 2 mm.

31. A method according to claim 29, wherein said metal sheet has a thickness of 50 to 300 μm.

* * * * *

UNITED STATES PATENT AND TRADEMARK OFFICE
CERTIFICATE OF CORRECTION

PATENT NO. : 4,542,073
DATED : September 17, 1985
INVENTOR(S) : TANAKA et al

It is certified that error appears in the above-identified patent and that said Letters Patent is hereby corrected as shown below:   Title page:

The assignee should be shown as:   KABUSHIKI KAISHA TOSHIBA
Kawasaki-Shi Japan.

Signed and Sealed this

Twenty-fifth Day of February 1986

[SEAL]

Attest:

DONALD J. QUIGG

Attesting Officer

Commissioner of Patents and Trademarks